US010731676B2

(12) United States Patent
Beger

(10) Patent No.: US 10,731,676 B2
(45) Date of Patent: Aug. 4, 2020

(54) ACTUATOR ARRANGEMENT

(71) Applicant: Festo SE & Co. KG, Esslingen (DE)

(72) Inventor: Artem Beger, Esslingen (DE)

(73) Assignee: FESTO SE & Co. KG, Esslingen (DE)

( * ) Notice: Subject to any disclaimer, the term of this patent is extended or adjusted under 35 U.S.C. 154(b) by 0 days.

(21) Appl. No.: 16/377,948

(22) Filed: Apr. 8, 2019

(65) Prior Publication Data

US 2019/0316605 A1 Oct. 17, 2019

(30) Foreign Application Priority Data

Apr. 13, 2018 (DE) ........................ 10 2018 205 636

(51) Int. Cl.
| F15B 11/10 | (2006.01) |
| F15B 15/12 | (2006.01) |
| F15B 13/044 | (2006.01) |
| B25J 9/14 | (2006.01) |
| F15B 11/00 | (2006.01) |
| F15B 13/00 | (2006.01) |

(52) U.S. Cl.
CPC .............. F15B 11/10 (2013.01); B25J 9/148 (2013.01); F15B 11/006 (2013.01); F15B 13/044 (2013.01); F15B 15/12 (2013.01); F15B 2013/002 (2013.01); F15B 2013/004 (2013.01); F15B 2211/426 (2013.01); F15B 2211/455 (2013.01); F15B 2211/46 (2013.01); F15B 2211/7058 (2013.01)

(58) Field of Classification Search
CPC .............. F15B 11/006; F15B 2013/002; F15B 2013/004; F15B 15/12; B25J 9/148
See application file for complete search history.

(56) References Cited

U.S. PATENT DOCUMENTS

| 4,496,279 A * | 1/1985 | Langer ..................... B25J 9/046 414/729 |
| 5,261,316 A * | 11/1993 | Nishikawa ................. B25J 9/06 91/422 |
| 9,528,617 B2 * | 12/2016 | Maichl ................ F15B 13/0803 |
| 9,782,894 B2 * | 10/2017 | Ryu .......................... B25J 9/146 |
| 9,976,577 B2 * | 5/2018 | Ryu ......................... F15B 15/12 |
| 2014/0219771 A1 | 8/2014 | Henrickson et al. |

(Continued)

FOREIGN PATENT DOCUMENTS

EP 2614260 A1 7/2013

*Primary Examiner* — Michael Leslie
(74) *Attorney, Agent, or Firm* — Hoffmann & Baron, LLP

(57) ABSTRACT

An actuator arrangement, having a drive for providing a rotational movement about an axis of rotation and which includes an actuator housing whose outer surface extends with a curved profiling along the axis of rotation and which delimits a working space, in which a working element is rotatably accommodated, which includes a drive shaft which penetrates a front surface of the actuator housing, wherein the actuator housing is penetrated by a working port, which is designed for a connection of the working space with a valve arrangement, and with a valve arrangement, which is designed for a provision of a fluid flow at the working port and which includes a valve module, which is accommodated in a valve shaft of a valve housing and which has a fluid port, wherein the valve housing extends with a profiling in the form of a circular ring section along the axis of rotation.

10 Claims, 5 Drawing Sheets

(56) References Cited

U.S. PATENT DOCUMENTS

| | | | |
|---|---|---|---|
| 2018/0194000 A1* | 7/2018 | Smith | B25J 9/148 |
| 2019/0314981 A1* | 10/2019 | Markowski | F15B 15/12 |
| 2019/0316604 A1* | 10/2019 | Markowski | F15B 15/202 |
| 2019/0316609 A1* | 10/2019 | Beyerlein | F15B 13/044 |

* cited by examiner

ACTUATOR ARRANGEMENT

BACKGROUND OF THE INVENTION

The invention relates to an actuator arrangement for providing a movement, with a drive which is designed for a conversion of a fluid flow into a rotational movement about an axis of rotation and which comprises an actuator housing, in particular of a circular-cylindrical design, whose outer surface is extended with a curved profiling along the axis of rotation and which delimits a working space in which a working element is rotatably accommodated, which comprises a drive shaft arranged coaxially to the axis of rotation, which passes through a front surface of the actuator housing, whereby the actuator housing is penetrated by a working port, which is designed for a connection of the working space with a valve arrangement, as well as with a valve arrangement, which is designed for providing a fluid flow at the working port.

From EP 2 614 260 B1 a fluid-operated rotary drive device is known, which comprises a housing in which a working space is formed. The working space has a circular outer contour which extends concentrically with respect to a main circumferential direction about a central axis, whereby a rotating piston, which is non-rotatably connected to an output member accessible from outside the housing and is pivotable about the central axis for a pivoting movement, is accommodated in the working space. The use of a valve device is also known for a fluidic actuation of such a rotary drive device, for example a valve terminal with a plurality of fluid valves, which in particular is connected to the rotary drive device via flexible hoses in order to ensure the desired fluid supply and fluid discharge to and from the rotary drive device. The known rotary drive device can be used together with the known valve device, for example, to provide a pivotal movement of a second machine component relative to a first machine component.

SUMMARY OF THE INVENTION

The object of the invention is to provide an actuator arrangement which enables a compact design and a simplified provision of the fluid streams to the drive.

This object is achieved for an actuator arrangement according to the invention. It is provided that the valve arrangement comprises a valve module, which is accommodated in a valve shaft of a valve housing, which is in particular fluid-tight, wherein the valve module has a fluid port, and wherein the valve housing is extended with a profiling in the form of a circular ring section along the axis of rotation.

To achieve the compact design for the actuator assembly it is provided that the valve housing is arranged immediately adjacent to the actuator housing, in directly connected with the actuator housing. The profiling of the valve housing in the form of a circular ring section means that a projection of a surface of the valve housing facing towards the actuator housing and a projection of a surface of the valve housing facing away from the actuator housing in a cross-sectional plane, which is aligned transversely to the axis of rotation, shows that each have a curved cross-section, in particular in the form of a circular arc section. Furthermore, it may be provided that the surface of the valve housing facing away from the actuator housing forms a largest surface of the valve housing. The surface of the valve housing facing towards the actuator housing forms, due to the radially inner arrangement with respect to the axis of rotation, a marginally smaller, in particular second largest, surface of the valve housing. Furthermore, the valve housing in each case has strip-like side surfaces at least substantially aligned transversely to a circumferential direction, in particular extending in the radial direction, which connect the aforementioned surfaces.

The outer surfaces described above are formed by wall sections of the valve housing, which are in particular integrally connected to one another. These wall sections delimit at least one valve shaft, which is formed in the valve housing and which is provided for receiving a valve module. Preferably, the valve shaft extends with one at least substantially constant profiling along the axis of rotation in the valve housing, for example for receiving a valve module which is rectangularly profiled along the axis of rotation. Particularly preferably, the valve housing is formed as a plastic injection-moulded part or is produced in a generative process, for example by laser sintering of plastic powder or of metal powder.

By way of example, the valve module is an electropneumatic subassembly, comprising an electrically controlled valve actuator, such as a Piezo bender, comprising a valve member movable by the valve actuator and a channel housing, in which at least one fluid channel is formed, whose cross section can be influenced by a change in position of the valve member, in particular between an open position and a closed position. Furthermore, the valve module has at least one fluid port at one front surface, to which a fluid line can be connected in order to enable the fluid, which flows through the fluid channel in the valve module when the valve member is open, to be conducted, for example, to a fluid load. Preferably the valve module is provided as a complete assembly and is adapted to the valve shaft of the valve housing such that during an assembly process, in particular an insertion movement of the assembly along the axis of rotation, electrical pins extending from an axial surface of the valve module in the direction of the axis of rotation penetrate recesses provided in the base of the valve housing to allow an electrical contact of the valve module from outside of the valve housing. It is preferably provided that the pins are accommodated sealingly in the valve housing. By way of example, it is provided that a fluid pressure of a supply fluid is present in the valve shaft and the valve module is designed to establish or interrupt a connection between the valve shaft, the fluid channel and the fluid port depending on the position of the valve member.

Advantageous embodiments of the invention are the subject of the dependent claims.

It is expedient if the valve housing has a first, concave profiled wall section facing the actuator housing and a second, convex profiled wall section facing away from the actuator housing. In this case, the first wall section determines the outer surface of the valve housing facing towards the actuator housing and, when viewed from the outside, has a concave profiling. The second wall section determines an outer surface of the valve housing which faces away from the actuator housing and, when viewed towards the outside, has a convex profiling. It is preferably provided that the first wall section and the second wall section have an at least substantially constant profiling along an extension axis which is aligned parallel to the axis of rotation. A constant profiling of the wall sections can also include a draft, so that production of the valve housing is facilitated, in particular in a plastic injection moulding process.

In a further embodiment of the invention, it is provided that the first wall section, in particular coaxially aligned with the axis of rotation, is profiled in the form of a circular arc section and/or that the second wall section, in particular coaxially aligned with the axis of rotation, is profiled in the form of a circular arc section. Such a design of the first wall section and the second wall section is particularly advantageous if the actuator housing is formed circular-cylindrically, since in this case the valve housing can fit compactly to the circular-cylindrical outer wall of the actuator housing and requires little additional installation space due to the circular-arc section-shaped profile along the axis of rotation.

In an advantageous embodiment of the invention, it is provided that the actuator housing has a first working port and a second working port and that the valve housing comprises a first valve shaft having a first valve module accommodated therein and a second valve shaft having a second valve module accommodated therein, whereby the first valve module is associated with a first fluid port connected to the first working port and whereby the second valve module is associated with a second fluid port connected to the second working port. It can optionally be provided that the two valve shafts of the valve housing are formed separated from one another, so that each of the two valve modules accommodated in the valve housing can provide an individual fluid pressure. Alternatively, the two valve shafts of the valve housing may be coupled together. In this way, for example, an optional, in particular alternating, provision of the same pressurised fluid by means of the first and the second valve module to the respective fluid port is made possible. Further, since the first fluid port of the first valve module is connected to the first working port of the actuator housing and the second fluid port of the second valve module is connected to the second working port of the actuator housing, a targeted loading of a respective working port with the pressurised fluid can take place. Such a fluid supply to a drive can be provided, for example, if the drive is an air motor which can be operated in opposite directions of rotation depending on a supply of pressurized fluid.

By way of example, it is provided that the two valve modules are electrically connected to a valve control unit associated with the valve housing, which electrically controls at least one of the two (first and second) valve modules to allow a provision of pressurised fluid at the associated fluid port. By way of example, it may be provided that the valve control unit is applied to a printed circuit, in particular a printed circuit board or a flexible conductor foil, which is arranged in particular in one of the valve shafts or in a recess of the valve housing arranged on the front side. Alternatively, it can be provided that the electrical connection pins of the valve modules are connected outside of the valve housing with a connection board, which in turn is connected via a cable connection with the valve control unit arranged remote from the valve housing. It is particularly preferred for a guidance of the cable connection that a shaft is formed in the valve housing, which is aligned parallel to the valve shaft.

In an advantageous embodiment of the invention, it is provided that the first fluid port of the first valve module accommodated in the valve housing is connected to a third fluid port of a third valve module and that the second fluid port of the second valve module accommodated in the valve housing is connected to a fourth fluid port of a fourth valve module and that the third valve module is accommodated in a third valve shaft of a second valve housing and that the fourth valve module is accommodated in a fourth valve shaft of the second valve housing. In this case, for example, the first and the second valve module can be used as air intake valves, for which a pressurised supply fluid is provided at the first valve housing via the distributor plate and the input port formed thereon. The supply fluid can be provided by the first and the second valve module at the first and second fluid ports and thus at each assigned first and second working port of the actuator housing.

Furthermore, a third valve module and a fourth valve module, which are accommodated in third and fourth valve shafts of a second valve housing separate from the (first) valve housing, serve as exemplary exhaust valves for discharge of pressurised fluid from the respective (first or second) working port of the actuator housing. For this purpose, an output port connected with the second valve housing may be provided in the distributor plate, which opens into a fluid channel in the distributor plate and is conducted therefrom, for example, to a silencer outlet. It is preferably provided that at least one valve module is designed as a 2/2-way valve, which can be used for blocking or releasing a connection between the input port associated with the distributor plate, the valve shaft, the fluid channel in the channel housing of the valve module and the associated fluid port.

In a further embodiment of the invention it is provided that the two working ports are designed on an axial surface of the actuator housing, in particular aligned parallel to the axis of rotation, that the fluid ports of the respective valve modules are arranged on an axial surface of the valve housing, in particular aligned parallel to the axis of rotation, and that the working ports of the actuator and the fluid ports of the valve modules are each connected with fluid channels, which are formed in a distributor plate, which abuts the axial surfaces of the actuator housing and the valve housing. The main task of the distributor plate is simply to establish a compact connection between the working ports of the actuator housing and the fluid ports of the valve modules. It is preferably provided that in the distributor plate a first fluid channel is formed, which connects the first fluid port of the first valve module with the third fluid port of the third valve module and also with the first working port. Furthermore, the distributor plate comprises a second fluid channel, which connects the second fluid port of the second valve module with the fourth fluid port of the fourth valve module and with the second working port. The arrangement of the distributor plate on the actuator housing and on the valve housings, which is arranged in the axial direction, allows a compact design of the actuator arrangement in which flexible tube connections can be dispensed with, at least between the valve housings and the actuator housing, since the fluidic communication in this area is ensured by the fluid channels in the distributor plate.

It is preferably provided that the distributor plate is provided with tubular connecting pieces which protrude in the axial direction from a surface of the distributor plate and which serve as openings for the fluid channels in the distributor plate. These connecting pieces engage in the working ports and/or fluid ports formed as bores, in particular with integrated O-ring seal, whereby an advantageous and fluid-tight coupling of the drive and/or the valve arrangement to the fluid channels in the distributor plate can be ensured.

In an advantageous embodiment of the invention, it is provided that the valve housings abut in each case with an axial surface, in particular sealingly, against an opposite axial surface of the distributor plate and that the distributor plate is formed for a fixing of the valve housing on the actuator housing. In this case, use is made of the fact that the (first and second or third and fourth) fluid ports are respectively formed on the channel housing of the respective valve module, in particular as bores in the channel housing, so that the fluid ports of the valve modules can be carried through the correspondingly arranged connecting pieces on the distributor plate in direct fluidic communication. By way of example, it is provided that on the axial surface of the valve housing, which is opposite to the distributor plate and can be sealingly connected to the distributor plate, the two (first and second or third and fourth) valve shafts, which are formed for receiving the two (first and second or third and fourth) valve modules, open out. Furthermore, it can be provided that on the axial surface of the distributor plate additionally an input port is formed, which opens out into the valve shaft of the respective opposite valve housing and thus can supply this valve shaft, for example with compressed air.

It is expedient for the distributor plate or a distribution block assigned to the distributor plate to have a centrally arranged shaft recess, which is provided on a circumferential inner wall with an annular channel, which is connected with a supply channel formed in the distributor plate, and in that the drive shaft is penetrated along the axis of rotation by a fluid bore, which opens out remote from an end section of the drive shaft in a radial bore, which is arranged opposite to the annular channel. In this way, a connection between a connection port, in particular frontally formed on the drive shaft, can be achieved through the fluid bore of the drive shaft to the radial bore and from there into the annular channel and the associated supply channel. By way of example, it is provided that the supply channel is connected to the input port of the distributor plate and thus communicates with the respective associated valve housing and can be used, for example, for a fluid supply into the valve housing.

In an advantageous embodiment of the invention, it is provided that the working element is designed as a rotary vane and divides the working space into a first subspace and into a second subspace in conjunction with a sealing element extending along the axis of rotation, which is fixed in the working space, whereby a working port is assigned to the first subspace and the second subspace. As a result, depending on a pressure difference between the first subspace and the second subspace, a pivoting movement of the rotary vane about the axis of rotation and a pivoting movement of the drive shaft coupled to the rotary vane can be caused, which is accompanied by a change in size of the first subspace and the second subspace. It is preferably provided that the rotary vane and the drive shaft can sweep over a pivoting range of at least 180 degrees, preferably 240 degrees, particularly preferably 270 degrees, in particular 300 degrees.

It is preferably provided that the drive is designed as a hinge for the pivotable coupling of a first arm section with a second arm section of a pivoting arrangement, in particular a robot arm.

BRIEF DESCRIPTION OF THE DRAWINGS

An advantageous embodiment of the invention is shown in the drawing. This shows.

DETAILED DESCRIPTION

Figure 1:
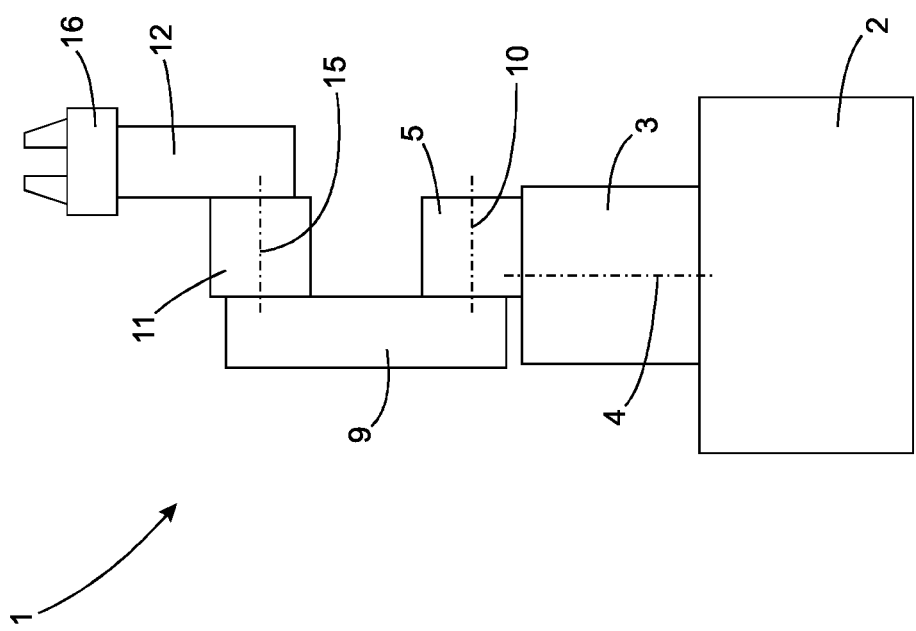
FIG. 1 a purely schematic drawing of an actuator arrangement in an exemplary embodiment as a multi-axis robot, in which a drive for providing a pivoting movement is assigned to each of a first arm section and a second arm section, FIG. 2 a perspective view of a drive for providing a pivoting movement, FIG. 3 an exploded view of the drive according to FIG. 2, FIG. 4 an exploded view of the valve arrangement for the drive according to FIG. 2, FIG. 5 a perspective view of a valve module for use in the valve arrangement according to the FIG. 4, and FIG. 6 a schematic drawing of a fluidic connection for the drive according to FIG. 2.

An actuator arrangement 1 purely schematically illustrated in FIG. 1, in an exemplary design as a multi-axis robot comprises a base 2, which is designed, in a manner not shown in more detail, for attachment to a floor of a machine shop or on a work table. Further, the actuator assembly 1 comprises a rotary column 3 which is rotatably mounted on the base 2, whereby in the base 2, a drive, not shown in more detail, for initiating a rotational movement is arranged on the rotary column 3, so that the rotary column 3 can perform a rotational movement about a pivot axis 4.

Figure 2:
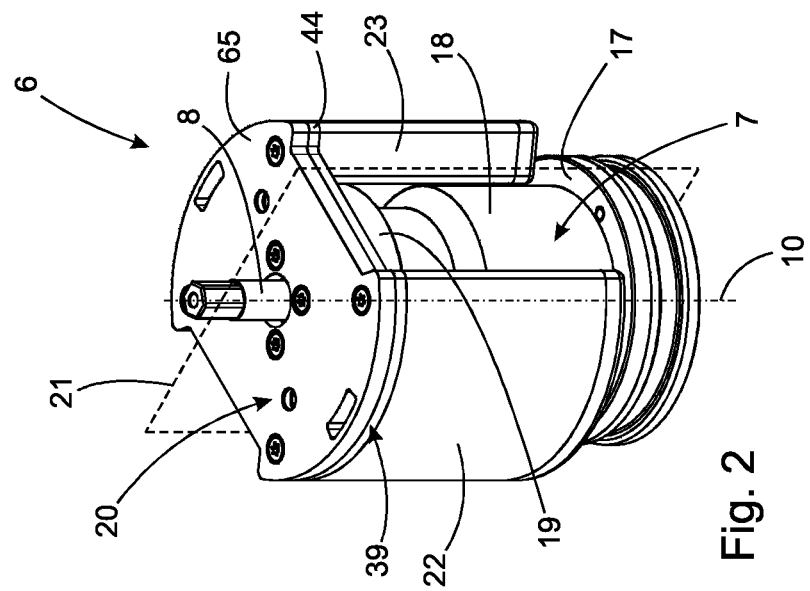
Figure 3:
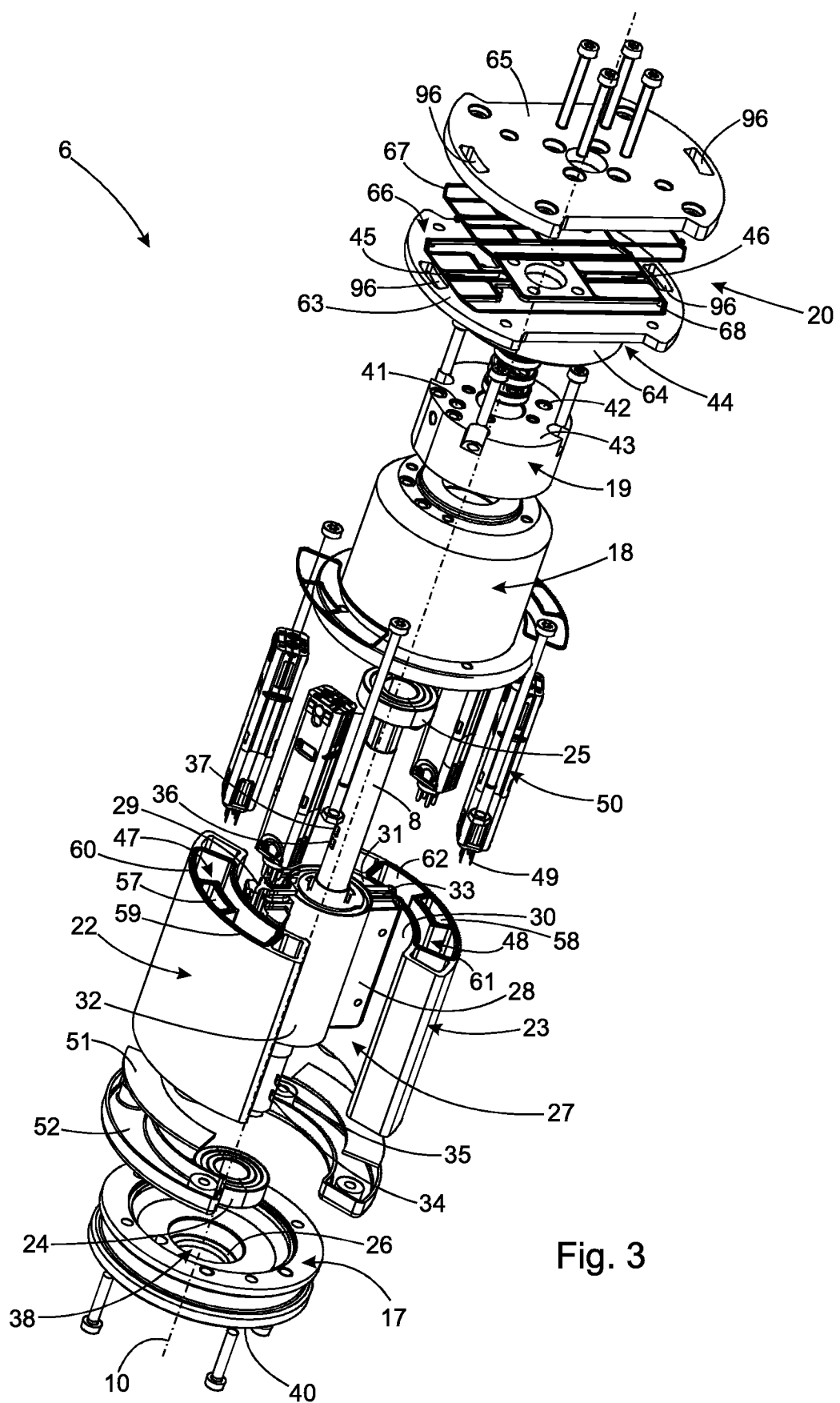

At a top of the rotary column 3, a drive housing 5 is mounted, in which a drive 6 is accommodated, which is illustrated in more detail in FIGS. 2 and 3, and which is non-rotatably fixed with an actuator housing 7 in the drive housing 5 and which has a drive shaft 8 rotatably mounted with respect to the actuator housing 7. The drive shaft 8 is in turn non-rotatably connected to a first arm section 9, so that during a rotational movement of the drive shaft 8 about an axis of rotation 10 a pivoting movement of the first arm section 9 relative to the drive housing 5 takes place. On an end section of the first arm section 9 opposite the drive housing 5, a second drive housing 11 is fixedly mounted, in which a drive 6 is accommodated in a manner not shown in more detail. The drive shaft 8 of the drive 6 accommodated in the drive housing 11 is non-rotatably connected with a second arm section 12, whereby the drive 6 can cause a rotational movement of the second arm section 12 with respect to the first arm section 9 by a pivoting movement of the drive shaft 8 about the second axis of rotation 15.

Purely illustratively, a parallel gripper 16 is arranged on an end section of the second arm section 12 opposite the drive housing 11, with the aid of which objects, not shown in more detail, can be gripped, in order to spatially relocate these with the actuator arrangement 1 by performing rotational movements and pivoting movements about the pivot axis 4 and the axes of rotation 10 and 15.

By way of example, it is provided that the same drive 6 is accommodated in the drive housing 5 and in the drive housing 11, as shown in more detail in FIGS. 2 and 3. The drive 6 may purely illustratively constitute a pneumatic swivel drive whose drive shaft 8 can perform a pivoting movement about an axis of rotation 10 in relation to the actuator housing 7 within a pivoting-angle range (not shown), which is in particular greater than 180 degrees. Preferably, the actuator housing 7 is formed rotationally symmetrically to the axis of rotation 10 and comprises a base section 17 described in more detail hereinafter, a work section 1.

According to the illustration of FIG. 2, a channel section 19 is arranged in the axial direction adjacent to the actuator housing 7, which is also referred to as a distribution block and which is connected to a distributor plate 20, which is fixed according to FIG. 3 on the channel section 19 and supports the valve housing 22, 23, which is arranged mirror-inverted to a plane of symmetry 21, and is described in more detail hereinafter.

As can be seen from the exploded view of FIG. 3, each of the aforementioned assemblies of the drive 6 is again divided into a plurality of subassemblies, which will be described in more detail hereinafter.

The drive 6, which is embodied purely exemplarily as a swivel drive (rotary drive), comprises the drive shaft 8 in addition to the actuator housing 7, which is formed from the base section 17 and the work section 18. The drive shaft 8 extends coaxial with the axis of rotation 10 and is rotatably supported in the base section 17 and in the work section 18 with schematically illustrated ball bearings 24, 25.

A circular-cylindrical inner wall, not visible in FIG. 3, of the work section 18, an adjoining, also not visible, annular front surface of the work section 18 and an annular end face 26 of the base section 17 delimit a circular-cylindrical working space 27. The working space 27 is divided into a first subspace 30 and into a second subspace 31 by a rotary vane 28 fixedly extended along the axis of rotation 10, and non-rotatably fixed to the drive shaft 8, as well as by a sealing element 29 fixedly extended along the axis of rotation 10 and fixed in the work section 18 in a manner not shown in more detail.

By way of example, it is provided that the strip-shaped sealing element 29 sealingly abuts both on a circular-cylindrical inner surface of the work section 18, not visible in FIG. 3, and on a circular-cylindrical outer surface 32 of the rotary vane 28, and, in conjunction with the rotary vane 28, ensures at all times the desired seal between the first subspace 30 and the second subspace 31 during a pivoting movement of the drive shaft 8 about the axis of rotation 10. For this purpose, a second sealing element 33 is further provided, which extends from an unspecified axial end face of the pivoting vane 28 along a radial end face of the rotary vane 28 to an oppositely disposed axial end face of the pivoting vane 28.

By way of example, it is provided that the drive shaft 8 has a first radial bore 34 and a second radial bore 35 at one end section. In this case, the first radial bore 34 is connected with a third radial bore 36 via a fluid bore, not shown in more detail, aligned parallel to the axis of rotation. Likewise, the second radial bore 35 is connected with a fourth radial bore 37 via a fluid bore (not shown) aligned parallel to the axis of rotation 10.

By way of example, the base section 17 is penetrated by a circular-cylindrical shaft recess 38, which is formed purely exemplarily as a stepped bore, which is penetrated by the drive shaft 8 and which is provided for receiving the ball bearing 24. Otherwise, the shaft recess 38 serves for a fluid supply to or from the respective radial bore 34, 35. For this purpose, the shaft recess 38 purely exemplarily comprises two annular channels, not shown in more detail, which are each connected at the front to a connecting bore, not visible in the illustration of FIG. 3, arranged on an end face 40 of the base section 17, to which, for example, a fluid hose can be connected. This allows a fluid supply into the drive shaft 8 and/or a fluid discharge out of the drive shaft 8.

For a connection between the radial bores 36 and 37 in the drive shaft 8 and the subspaces 30 and 31, further ring channels, not shown in more detail, are designed in the channel section 19, which are, for example, connected with axial channels 41, 42, which open out on an annular front surface 43 of the channel section 19. Supply channels 45, 46, each formed in a radial direction, originating from the mouth openings of the axial channels 41 and 42, are distributed in a lower section 44 of the distributor plate 20, with which a connection to receiving shafts 47, 48 of the valve housing 22, 23 can be created. Here, the receiving shafts 47, 48 serve in a dual function both for receiving each of two valve modules 50 described in more detail below and as input ports for the respective valve housing 22, 23.

By way of example, the two valve housings 22, 23 are formed as profile parts with a profiling which is at least substantially constant along the axis of rotation 10 and can be produced, for example, as plastic injection-moulded parts or as laser sintered parts from metal or plastic powder. At an axial end section not visible in FIG. 3, the two valve housings 22, 23 are each provided with a base section which is penetrated by bores which are not visible in FIG. 3. These bores are penetrated by the insertion of the valve modules 50 of the electrical contact pins 49 of the valve modules 50. By way of example, the valve modules 50 in the region of the contact pins 49 are associated with sealing means, not shown in more detail, so that the two valve housings 22, 23 are sealed at the ends after insertion of the valve modules 50. The contact pins 49 are then connected to a contact plate 51 in the form of a circular ring section, which in turn are connected by means of a cable connection, not shown in more detail, with a control board, also not shown in more detail, arranged, for example, in the axial direction above the distributor plate 20, on which an electronic circuit, not shown in more detail, is arranged, which is used for an electrical control of the two valve modules 50. By way of example, each of the valve housings 22, 23 is associated with an axially continuous cable duct 57, 58, in which the cable connection, not shown in more detail, can be guided and to which a cable feedthrough 96 in the distributor plate 20 connects. The valve housings 22, 23 with the valve modules 50 accommodated therein form, together with the distributor plate 20, a valve arrangement 39, of which essential components are shown in FIG. 4.

Figure 5:
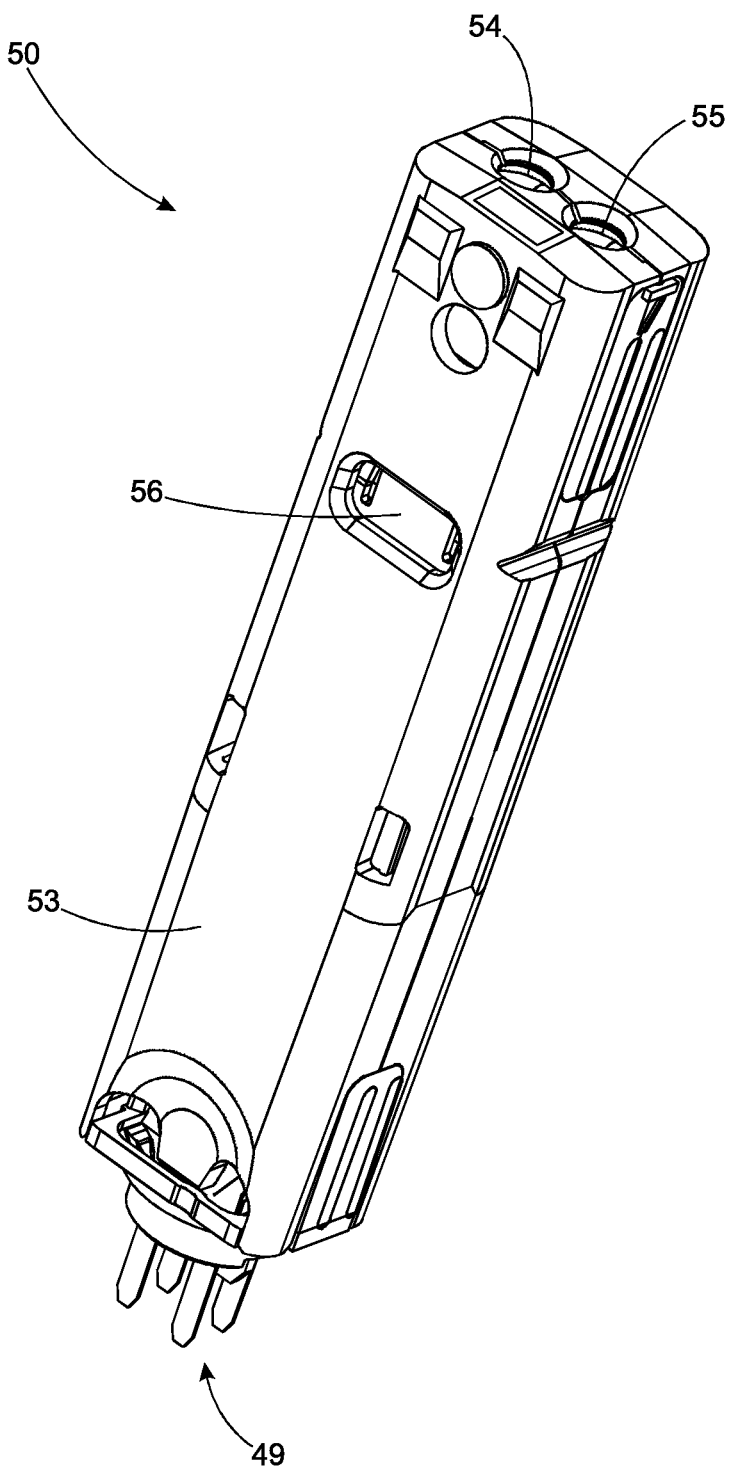

As can be seen from the illustration of FIG. 5, each of the valve modules 50 is formed like a cartridge, wherein by way of example two Piezo benders, which can be controlled electronically mutually independently, are arranged in a substantially cuboid housing 53 of the valve module 50, which each support a valve member, also not shown in more detail. At one end section of the valve module 50 opposite the contact pins 49, two purely illustrative fluid ports 54, 55 are formed in a circular-cylindrical design, which are mouth openings of fluid channels, not shown in more detail, designed in the housing 53. Each of the fluid channels can be opened or closed by means of the respective valve member, not shown in more detail, arranged opposite an inlet opening arranged laterally on the housing, in order to selectively establish or interrupt a connection between the inlet opening 56 and the fluid port 54, 55, whereby the valve function for the valve module 50 is achieved.

Figure 4:
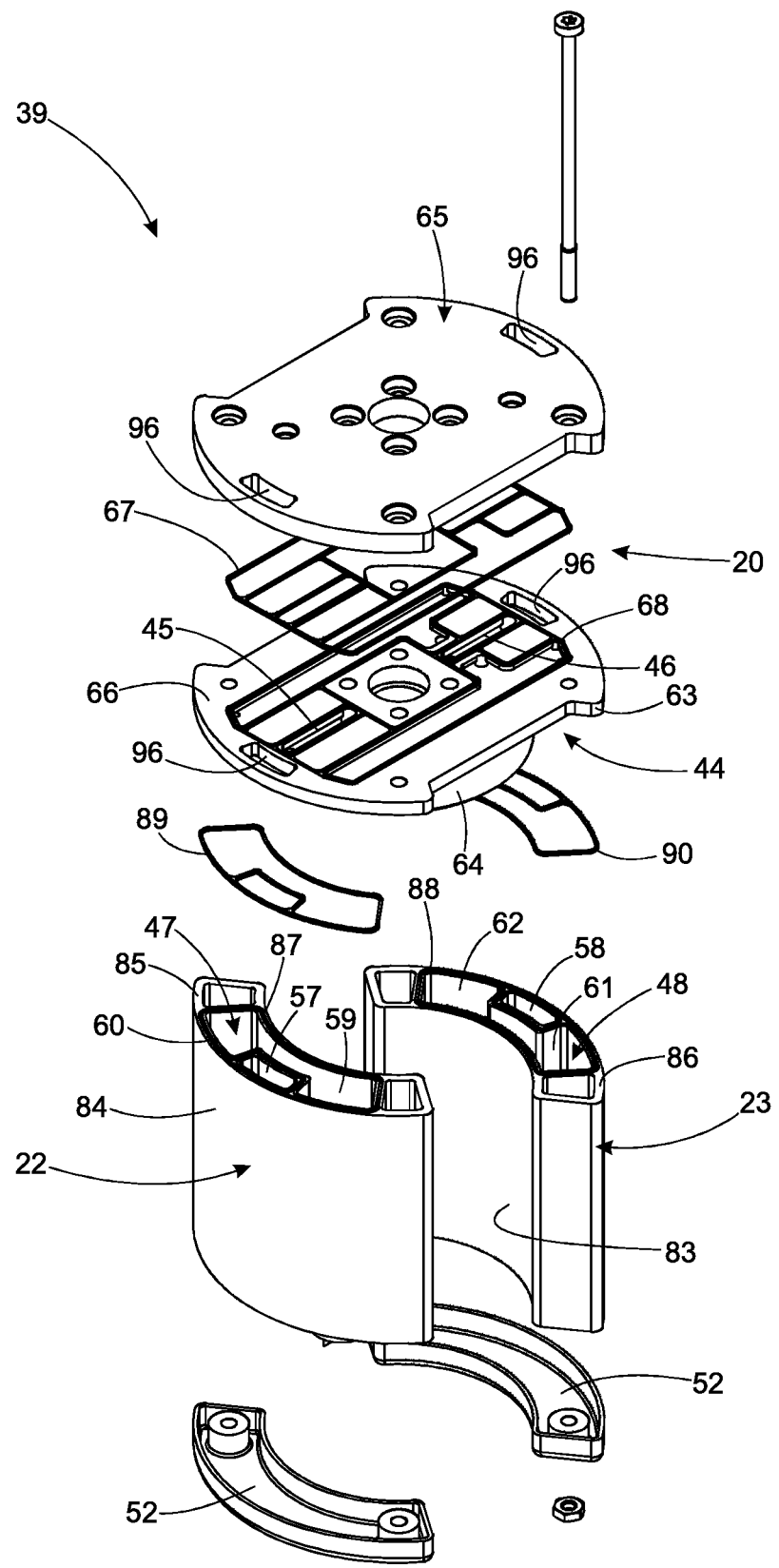

In the embodiment of the valve module 50 illustrated in FIGS. 2 and 4, it is provided that both fluid ports 54, 55 are connected with the inlet opening 56 in the open position of the respective valve members, so that the respective fluid pressure prevailing at the inlet opening 56 is also applied at both fluid ports 54, 55. Accordingly, by a synchronous or asynchronous control of the respective valve members, a doubling of the fluid flow can be achieved, which can flow through the valve module 50.

Purely as an example it is further provided that in each of the valve housings 22, 23 shown in FIGS. 3 and 4 two valve modules 50 are accommodated in each case, the respective accommodating shafts 47, 48 being subdivided into two valve shafts 59, 60 and 61, 62 respectively by the respective cable shaft 57, which also contributes to additional mechanical stiffening of the valve housing 22, 23.

By way of example, it is provided that all valve modules 50 in the two valve housings 22, 23 are respectively switched synchronously in order to bring about a reversal of the direction of rotation for the pivoting movement of the drive 6. Alternatively, it can also be provided that all valve modules 50 are switched into a locked position, so that the fluid is enclosed in the two subspaces 30, 31 of the drive 6, so that an at least substantial fixing of the drive shaft 8 takes place.

As can be seen from the illustration of FIGS. 3 and 4, each of the valve housings 22, 23 has a first wall section 83 facing towards the actuator housing 7 and concavely profiled, and a second wall section 84 facing away from the actuator housing 7 and convexly profiled. By way of example, it is provided that the first wall section 83 is profiled in a circular arc section and is oriented coaxially to the axis of rotation 10. By way of example, it is provided that the second wall section 84 is profiled in a circular arc section and aligned coaxially to the axis of rotation 10. As a result, the desired compact arrangement of the two valve housings 22, 23 on the actuator housing 7 is enabled.

The distributor plate 20 shown in FIG. 4 comprises, in addition to the lower part 44, which is designed by way of example as a plane-parallel plate 63, an upper part 65 which, purely illustratively, is designed as a plane-parallel plate. Furthermore, a sealing element 67 is provided for a fluidic seal between an upper side 66 of the plane-parallel plate 63 and an underside of the upper part 65, not shown in more detail, which is accommodated in a correspondingly formed groove arrangement 68 in the upper surface 66 of the plane-parallel plate 63.

Figure 6:
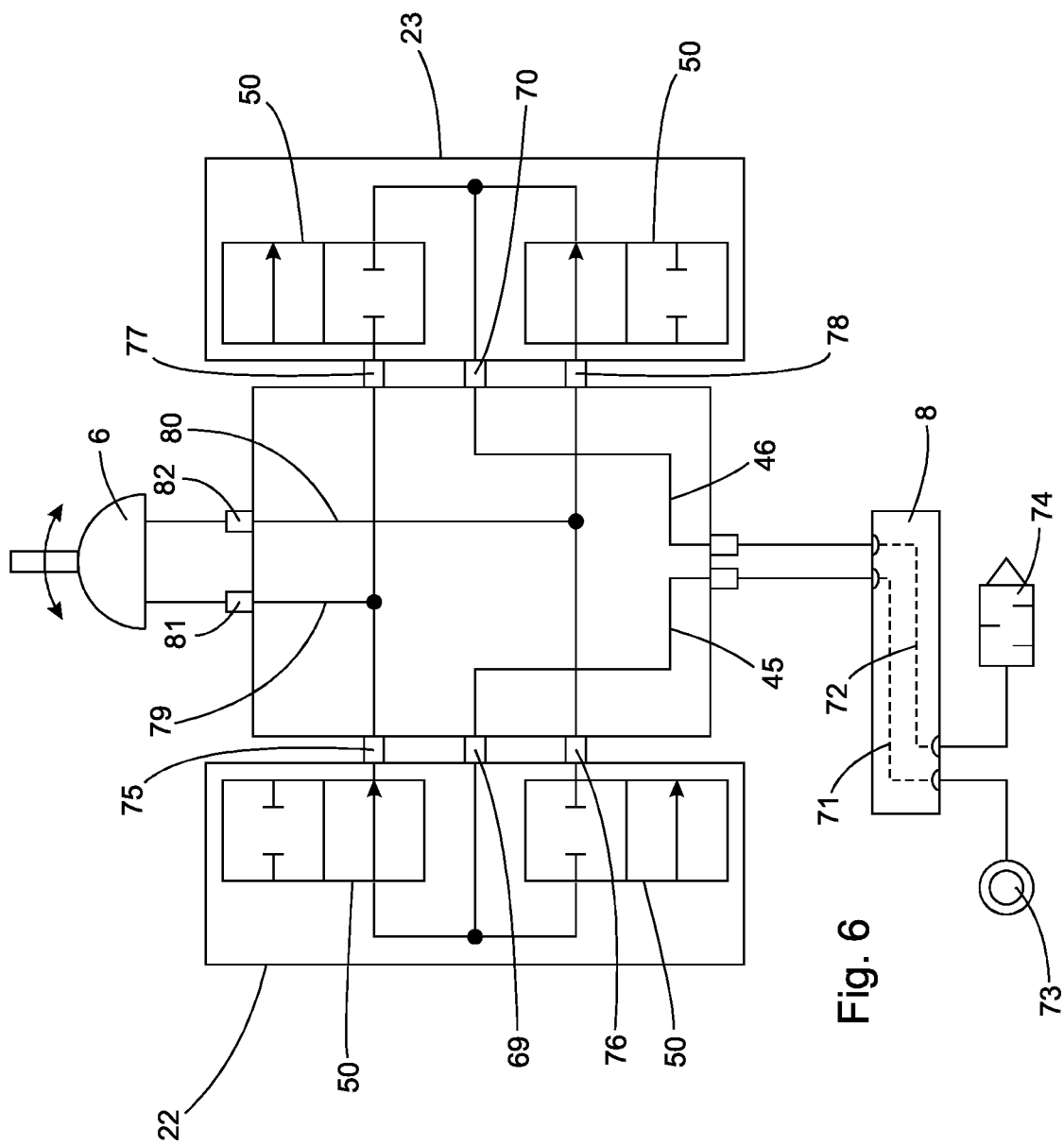

As can be seen from the schematic representation of FIG. 6, a total of four valve modules 50, each designed as 2/2-way valves, are assigned to the drive 6, which is designed purely illustratively as a swivel drive, whereby in the illustration of FIG. 6 it is disregarded that each of the valve modules 50 is equipped, for example, with two Piezo benders which can be controlled mutually independently and which can be controlled mutually synchronously or asynchronously for a doubling of the fluid flow through the respective valve module 50. The valve modules 50 are each accommodated in pairs in the valve housings 22 and 23 respectively.

By way of example, it is furthermore provided that the valve modules 50 accommodated in the valve housing 22 are each used as supply air valves, while the valve modules 50 arranged in the valve housing 23 are used as exhaust air valves.

By way of example, the receiving shaft 47 of the valve housing 22 is connected by means of the input port 69 formed in the distributor plate 20 with a supply channel 45, which in turn is connected to a purely schematic fluid bore 71 in the drive shaft 8, which is in turn connected with a fluid source 73. Accordingly, the receiving shaft 47 of the valve housing 22 can be supplied with a pressurised fluid provided by the fluid source 73.

By way of example, the valve shaft 48 of the valve housing 23 is connected with the supply channel 46 by means of the output port 70 formed in the distributor plate 20, which in turn is connected with a muffler 74 via a fluid bore 72 in the drive shaft 8, shown only schematically. Thus, an outflow of fluid from the receiving shaft 48 of the valve housing 23 is made possible with appropriate control of at least one of the valve modules 50 accommodated in the valve housing 23.

It is further provided that each of the valve modules 50 is connected with the distributor plate 20, shown strictly schematically, via the fluid ports 75, 76 or 77, 78. Fluid channels 79, 80 formed in the distributor plate 20 ensure the fluidic coupling between the fluid ports 75 to 78 and the working ports 81, 82 of the drive 6.

What is claimed is:

1. An actuator arrangement for providing a movement, with a drive, which is designed for a conversion of a fluid flow into a rotational movement about an axis of rotation and which comprises an actuator housing whose outer surface extends with a curved profiling along the axis of rotation and which delimits a working space, in which a working element is rotatably accommodated, which comprises a drive shaft arranged coaxially with the axis of rotation, which penetrates a front surface of the actuator housing, wherein the actuator housing is penetrated by a working port, which is designed for a connection of the working space with the valve arrangement, and with a valve arrangement, which is designed for a provision of a fluid flow at the working port, wherein the valve arrangement comprises a valve module, which is accommodated in a valve shaft of a valve housing, wherein the valve module has a fluid port and wherein the valve housing extends with a profiling in the form of a circular ring section along the axis of rotation.

2. The actuator arrangement according to claim 1, wherein the valve housing has a first, concave profiled wall section facing the actuator housing and a second, convex profiled wall section facing away from the actuator housing.

3. The actuator assembly according to claim 2, wherein at least one of the first wall section and the second wall section is profiled in the form of a circular arc section.

4. The actuator assembly according to claim 1, wherein the actuator housing has a first working port and a second working port, and wherein the valve housing comprises a first valve shaft with a first valve module accommodated therein and a second valve shaft with a second valve module accommodated therein, said first valve module having associated therewith a first fluid port connected to said first working port and said second valve module having associated therewith a second fluid port connected to said second working port.

5. The actuator arrangement according to claim 4, wherein the first fluid port of the first valve module accommodated in the valve housing is connected with a third output port of a third valve module, and wherein the second fluid port of the second valve module is connected with a fourth output port of a fourth valve module, and wherein the third valve module and the fourth valve module are accommodated in a third valve shaft and in a fourth valve shaft of a second valve housing.

6. The actuator arrangement according to claim 1, wherein the two working ports are aligned on an axial surface of the actuator housing, and wherein the fluid ports of the respective valve modules are aligned on an axial surface of the valve housing, and wherein the working ports and the fluid ports are each connected with fluid channels, which are formed in a distributor plate, which abuts the axial surfaces of the actuator housing and the valve housing.

7. The actuator arrangement according to claim 6, wherein the valve housings abut in each case with an axial surface on an opposite axial surface of the distributor plate, and wherein the distributor plate for fixing the valve housings is formed on the actuator housing.

8. The actuator arrangement according to claim 6, wherein the distributor plate or a distribution block associated with the distributor plate has a centrally arranged shaft recess which is provided on a circumferential inner wall with an annular channel, which is connected with a supply channel formed in the distribution plate, and wherein the drive shaft is penetrated along the axis of rotation by a fluid bore, which opens out separated by an end section of the drive shaft into one radial bore, which is arranged opposite the annular channel.

9. The actuator arrangement according to claim 1, wherein the working element is designed as a rotary vane and divides the working space into a first subspace and into a second subspace in conjunction with a sealing element extending along the axis of rotation, which is fixed in the working space, whereby a working port is assigned to the first subspace and the second subspace.

10. The actuator arrangement according to claim 1, wherein the drive is designed as a hinge for the pivotable coupling of a first arm section with a second arm section of a pivoting arrangement.

* * * * *